UNITED STATES PATENT OFFICE.

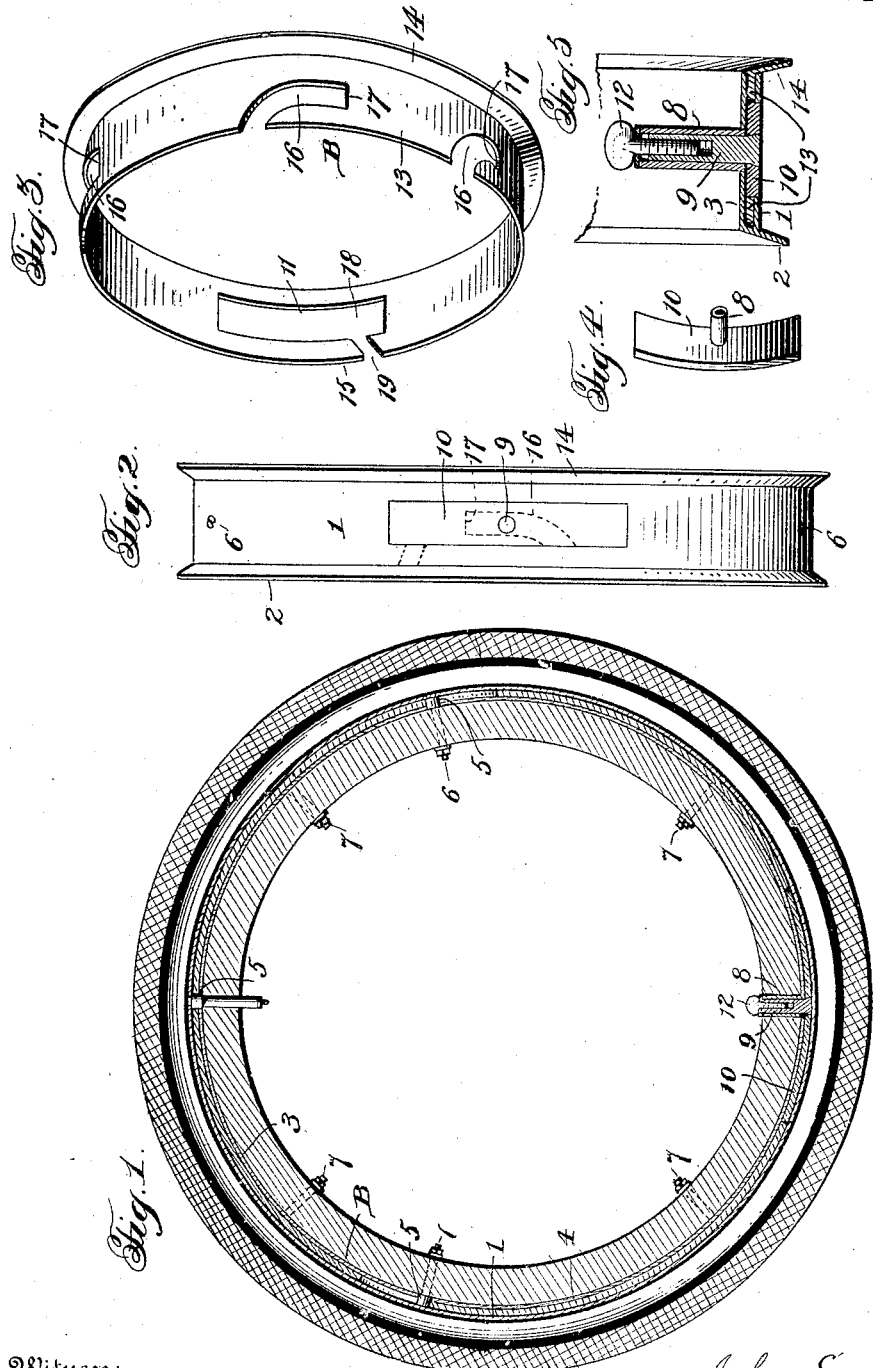

JOHN EGAN, OF MEMPHIS, TENNESSEE.

TIRE-RIM.

1,368,493.  Specification of Letters Patent.  Patented Feb. 15, 1921.

Application filed April 2, 1918. Serial No. 226,216.

*To all whom it may concern:*

Be it known that I, JOHN EGAN, citizen of the United States, residing at #1080 Peach St., Memphis, in the county of Shelby and State of Tennessee, have invented certain new and useful Improvements in Tire-Rims, of which the following is a specification, reference being had therein to the accompanying drawing.

My invention relates to demountable rims for automobiles or the like and has primarily the object of facilitating the removal of a tire from a wheel in an exceedingly simple and expedient manner.

More especially my invention relates to a demountable rim wherein the detachable or demountable section has curved slots formed therein, which slots engage lugs carried by the tire carrying portion of the rim, so it will be merely necessary to rotate the detachable portion and the same will work or ride itself from or into place upon the stationary part.

Further my invention relates to means associated with a rim of the above stated type, for positively fastening or locking the stationery and detachable sections of the rim together.

In order that my invention may be more clearly understood, reference is made to the following detailed description of the accompanying drawings, in which:—

Figure 1 is a central longitudinal sectional view.

Fig. 2 is a side elevation with the tire removed.

Figs. 3, 4 and 5 are detail views.

The particular embodiment of the invention illustrated in the drawing includes a stationary rim section comprising a tire-carrying rim part or band 1 provided with a flange 2. Concentric with the band 1 and slightly spaced therefrom is an inner band or rim portion 3 positively fastened or integrally formed therewith. The spaced relation of the two bands or rim portions 1 and 3 form a pocket 4 extending circumferentially around the entire stationary section of the rim. Within this pocket 4 are located vertically disposed lugs 5 extending the entire height of said pocket. These lugs 5 are disposed at four or more points around the rim and preferably have central bores for the reception of bolts 6, which bolts secure the section A to the wheel. Additional bolts 7 may be employed for further securing said section, these additional bolts being suitably disposed around and carried by the band 3. It is my intention to have the central bore of one of the lugs 5 extend entirely through both bands 1 and 3, which bore will afford an opening for the reception of the stem of the air valve carried by the tire. One of the lugs or tubes 5 is extended inwardly from the band 3 toward the center of the wheel, as at 8, instead of extending radially between the bands 1 and 3, and this tube 8 is adapted to receive a stem or lug 9 carrying a locking member 10. The locking member 10 consists of a rectangular shaped plate, the thickness of which is equal to the combined altitude and thickness of the pocket 4, and the band 1, respectively. The plate is curved to conform to the curvature of the bands, as shown in Fig. 4, and is adapted to fit within a rectangular slot or cutaway portion 11 of the band 1 and rest upon the upper surface of the band 3. This plate 10 is adapted to be disposed or to rest within a rectangular slot or cutaway portion 11 of the band 1 and rest upon the upper surface of the band 3. The stem 9 of the plate 10 extends through the tube 8 and has a screw-threaded bore in its inner end for the reception of the thumb-screw 12. Therefore, it will be seen that the plate 10 can be drawn tightly in place within the slot 11 by the thumb-screw 12 bearing against the tube 8 and can also be loosened and disengaged from said slot. It will be noted that the stem 9 replaces one of the lugs or tubes 5 and serves the same function, to be hereinafter referred to.

The detachable section B of the rim as shown in Fig. 3 of the drawing comprises a band 13 with an integrally formed flange 14 at its outer edge. This band 13 is slightly smaller circumferentially than the band 1 and slightly larger than the band 3. The band 13 has extending from its inner edge 15 toward the flange 14 a number of curved slots 16 terminating in a straight wall 17 parallel to the edge 15 and the flange 14. A rectangular portion of the band 13 is cutaway or stamped out as at 18, similar to the cutaway portion 11 of the band 1, and a communicating slot 19 leads from the edge 15 of the band thereto.

The coöperation of the two sections A and B is as follows: A tire is placed upon the band 1 of the section A, being put in place over the outer edge thereof, the locking plate 10 which is adjustably attached to the section A is loosened and raised to become disengaged from the slot or cutaway portion 11. The band 13 of the member B is then fitted between the two bands 1 and 3 with the curved slots 16 engaging the lugs or tubes 5 and the slot 19 of the cutaway part 18 engaging with the stem 9 of the plate 10. When in this position the section B is rotated in the direction of the arrow so that the curved slots 16 engaging the lugs 5 will cause the section B to practically work itself or be carried laterally into position upon the section A, namely: the band 13 being fully disposed between the bands 1 and 3 and the flange 14 abutting against the edges of the bands 1 and 3. In other words, the action of the slots 16 coacting with lugs 5 will cause the member B when rotated to be forced or carried into place upon the section A. The locking plate 10 is then lowered into place, engaging and filling the cutaway portions 11 and 18 and resting upon the upper surface of the band 3. The upper surface of the locking plate will then be flush with the upper surface of the band 1. The plate 10 is then securely fastened in this position by tightening the thumb-screw 12, thereby firmly holding the section B to the section A.

Obviously, the assembling or demounting of the sections A and B is the opposite to the above described operation. The locking plate 10 is loosened and elevated from engagement with the cutaway portions 11 and 18, the section B is rotated in the opposite direction to the one heretofore referred to and will work or carry itself off owing to the curved slots 16 coacting with the stationary lugs 5.

From the above description it will be seen that I have provided a rim which is very simple and expedient to manipulate. The demountable portion being very easily disengaged with little effort owing to the coöperation of the curved slots 16 and stationary lugs 5, which practically cause the same to carry itself into place and out of engagement with the stationary section. Also the use of tire tools may be and preferably is entirely obviated, and the locking means for the two sections is very simple and expedient.

Having thus described my invention, what I claim:—

1. A rim for wheels comprising a stationary and a detachable section, the stationary section having a tire-carrying portion formed with two spaced concentric sections having radial lugs intermediate the edges thereof, the detachable section being provided with a flange, and slots formed with curved walls extending through the unflanged edge of the detachable section to an intermediate portion thereof, said detachable section of the rim also having a spaced segmental slot therein disposed well within the borders of the body thereof, the curved slots in the detachable section being adapted to engage radial lugs on the stationary section to guide the detachable section in place upon its rotation, and a radially adjustable locking plate of segmental formation having means located within the interior of the rim for adjusting the same, being adapted to be moved within the segmental slot to maintain the detachable section in position.

2. A rim for wheels comprising a stationary and a detachable section, the stationary section having a tire-carrying portion formed with two spaced concentric sections having radial lugs intermediate the edges thereof, the detachable section being provided with a flange, and slots formed with curved walls extending through the unflanged edge of the detachable section to an intermediate portion thereof, said detachable section of the rim also having a spaced segmental slot therein disposed well within the borders of the body thereof, the curved slots in the detachable section being adapted to engage radial lugs on the stationary section to guide the detachable section in place upon its rotation, and a radially adjustable locking plate of segmental formation having means located within the interior of the rim for adjusting the same, being adapted to be moved within the segmental slot to maintain the detachable section in position, the radially adjustable segmental plate having its outer face lying flush with the body of the detachable section when adjusted to its operative position.

3. A rim for wheels comprising two sections adapted to be detachably connected together, one of said sections being provided with radial lugs, and the other section with substantially L-shaped slots adapted to coöperate with the lugs of the other sections to secure the parts together, one of said sections being adapted to fit over the other, the outer section being provided with an opening therein, in combination with a radially adjustable locking plate adapted to fit within the opening of the outer rim section and rest upon the outer surface of the inner rim section, and means on the inner rim section connected with said locking plate and adapted to maintain the same in locking position.

4. A rim for wheels comprising two sections adapted to be detachably connected together, one of said sections being provided with radial lugs and the other section with substantially L-shaped slots adapted to coöperate with the lugs of the other section to secure the parts together, one of said sections being adapted to fit over the other, the outer section being provided with a rectangular shaped opening therein, in combination with a radially adjustable rectangular shaped locking plate curved to conform to the curvature of the sections, said locking plate being adapted to fit within the opening of the outer rim section and rest upon the outer surface of the inner rim section with its outer face extending substantially flush with the outer face of the outer section, and means on the inner section connected with the locking plate and adapted to maintain the same in locking position.

5. A rim for wheels comprising two sections adapted to be detachably connected together, one of said sections being provided with radial lugs and the other section with substantially L-shaped slots adapted to coöperate with the lugs of the other section to secure the parts together, one of said sections being adapted to fit over the other, the outer section being provided with an opening therein, in combination with a radially adjustable locking plate adapted to fit within the opening of the outer rim section and rest upon the outer surface of the inner rim section, and means adapted to maintain the plate in locking position, said means including a tubular part on the inner rim section, a stem on the locking plate adapted to fit within said tubular part, and an adjusting screw engaging the stem and bearing against the said tubular part.

In testimony whereof I affix my signature in presence of two witnesses.

JOHN EGAN.

Witnesses:
  JOSEPH S. MENKE,
  WALLACE M. LAMBERT.